(12) United States Patent
Yi et al.

(10) Patent No.: US 8,063,943 B2
(45) Date of Patent: Nov. 22, 2011

(54) DIGITAL PHOTOGRAPHING APPARATUS, METHOD FOR CONTROLLING THE SAME, AND A RECORDING MEDIUM FOR STORING A PROGRAM TO IMPLEMENT THE METHOD

(75) Inventors: Dong Yi, Seongnam-si (KR); Sunk-shik Koh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 11/901,398

(22) Filed: Sep. 17, 2007

(65) Prior Publication Data
US 2008/0170132 A1   Jul. 17, 2008

(30) Foreign Application Priority Data
Jan. 17, 2007   (KR) .................. 10-2007-0005446

(51) Int. Cl.
*H04N 5/228* (2006.01)
*G06K 9/00* (2006.01)
(52) U.S. Cl. .................................. 348/222.1; 382/103
(58) Field of Classification Search .............. 348/222.1; 382/103
See application file for complete search history.

(56) References Cited

U.S. PATENT DOCUMENTS

| 6,940,545 | B1 * | 9/2005 | Ray et al. ............... 348/222.1 |
| 7,734,098 | B2 * | 6/2010 | Kikkawa et al. ........ 382/195 |
| 2004/0207743 | A1 * | 10/2004 | Nozaki et al. .......... 348/333.12 |
| 2006/0182433 | A1 * | 8/2006 | Kawahara et al. ......... 396/123 |
| 2006/0215924 | A1 * | 9/2006 | Steinberg et al. ......... 382/254 |
| 2007/0047941 | A1 * | 3/2007 | Iwane et al. ............ 396/123 |
| 2007/0064145 | A1 * | 3/2007 | Sugimoto ............... 348/345 |
| 2007/0110422 | A1 * | 5/2007 | Minato et al. .......... 396/89 |
| 2007/0171296 | A1 * | 7/2007 | Tsukiji et al. .......... 348/345 |
| 2009/0009598 | A1 * | 1/2009 | Sotodate ............... 348/143 |
| 2009/0135269 | A1 * | 5/2009 | Nozaki et al. .......... 348/222.1 |
| 2009/0179998 | A1 * | 7/2009 | Steinberg et al. ....... 348/222.1 |

FOREIGN PATENT DOCUMENTS

| JP | 2004-198715 A | 7/2004 |
| JP | 2006-227080 A | 8/2006 |
| KR | 10-2006-0031638 A | 4/2006 |

* cited by examiner

*Primary Examiner* — Lin Ye
*Assistant Examiner* — Amy Hsu
(74) *Attorney, Agent, or Firm* — Drinker Biddle & Reath LLP

(57) ABSTRACT

A digital photographing apparatus which automatically determines a face, as chosen by a user, on which autofocusing is to be performed while not imposing an excessive computational load on the digital photographing apparatus. Also provided is a control method for the digital photographing apparatus, and a recording medium storing a program for executing the control method. The digital photographing apparatus includes an image division unit dividing an image into a plurality of regions, a first score assignment unit assigning a first score to each face part included in the image according to a region to which the face part belongs, and a face part determination unit determining a face part on which autofocusing is to be performed, based on the first score assigned to each face part.

20 Claims, 6 Drawing Sheets

DIGITAL PHOTOGRAPHING APPARATUS, METHOD FOR CONTROLLING THE SAME, AND A RECORDING MEDIUM FOR STORING A PROGRAM TO IMPLEMENT THE METHOD

CROSS-REFERENCE TO RELATED PATENT APPLICATIONS

This application claims the benefit of Korean Patent Application No. 10-2007-0005446, filed on Jan. 17, 2007, in the Korean Intellectual Property Office, the disclosure of which is incorporated herein in its entirety by reference.

BACKGROUND OF THE INVENTION

1. Field of the Invention

The present invention relates to a digital photographing apparatus and a method for controlling the digital photographing apparatus, and a recording medium for storing a program for executing the control method. More particularly, the present invention relates to a digital photographing apparatus which automatically determines a face, as chosen by a user, on which autofocusing is to be performed in photographing a plurality of faces, without putting an excessive load on the digital photographing.

2. Description of the Related Art

In general, a digital photographing apparatus stores in a storage medium an image file, which is obtained by a photographing operation in a photographing mode and the digital photographing apparatus displays the image on a display unit by reproducing the image file stored in the storage medium in a playback mode. Also in the photographing mode, the photographing apparatus may reproduce an image file obtained by a photographing operation.

Digital photographing apparatuses are frequently used in order to take photos of a person. In this case, it is preferable to make the digital photographing apparatus focus on the face of the person being photographed. Accordingly, attempts are being made to develop a control method by which the face of a person is automatically detected and autofocusing is performed on the detected face.

However, these conventional techniques relate mostly to a case where the face of only one person exists in an image, and autofocusing is performed on the face by identifying the position of the face. Accordingly, when a plurality of faces exist in an image, the user of the digital photographing apparatus has to manually select an object for autofocusing, which can be inconvenient.

SUMMARY OF THE INVENTION

The present invention provides a digital photographing apparatus which automatically determines an object on which autofocusing should be performed as intended by the user of the apparatus. The autofocusing operation does not put an excessive load on the digital photographing apparatus. The present invention thus further provides a control method for the digital photographing apparatus, and a recording medium for storing a program for executing the control method.

An embodiment of the present invention thus provides a digital photographing apparatus including an image division unit for dividing an image into a plurality of regions, a first score assignment unit for assigning a first score to each face part included in the image according to a region to which the face part belongs, and a face part determination unit for determining a face part which is to be an object of autofocusing, based on the value of the first score assigned to each face part.

Another embodiment of the present invention provides a digital photographing apparatus including an image division unit for dividing an image into a plurality of regions, a first score assignment unit for assigning a first score to each face part included in the image according to a region to which the face part belongs, a second score assignment unit for assigning a second score to each face part according to the size of the face part, and a face part determination unit for determining a face part on which autofocusing is to be performed, based on the first score and the second score assigned to each face part.

The first score assignment unit may assign a score to each region and assigns a first score to each face part, with the first score having the same value as the score of the region to which each face part belongs. The face part determination unit may determine a face part having a highest first score or a lowest first score, as a face part on which autofocusing is to be performed. The face part determination unit may also determine a face part having a highest sum or mean of the first score and the second score, or a lowest sum or mean of the first score and the second score, as a face part on which autofocusing is to be performed. Alternatively, the face part determination unit may determine a face part on which autofocusing is to be performed, based on the sum or mean of a value obtained by assigning a first weight to the first score and a value obtained by assigning a second weight to the second score, for each face part. The first weight and the second weight can be preset by a user.

The image division unit may divide the image into a number of regions which is the same as the number of face parts included in the image. In addition, the image division unit may divide the image into concentric rectangles having the center of the image as their common center. The concentric rectangles may uniformly divide the image.

The first score assignment unit may assign a score to each region and assign a first score to each face part, with the first score having the same value as the score of the region to which each face part belongs. When the first score assignment unit assigns the score to each divided region, a highest first score may be assigned to the region inside an innermost rectangle of the concentric rectangles, and lower scores may be assigned sequentially to the regions further from the center of the image, or a highest score may be assigned to an outermost region of the regions divided by the concentric rectangles, and lower scores may be assigned sequentially to the regions closer to the center of the image. The highest score may correspond to the number of regions into which the image is divided. The first score assignment unit may determine a region in which one vertex of a rectangle inscribed in or circumscribed about each face part is located, as the region to which the face part belongs, and assign a first score to the face part according to the region to which the face part belongs. Also, the first score assignment unit may determine a region in which the top left vertex of a rectangle inscribed in or circumscribed about each face part is located, as the region to which the face part belongs, and assign a first score to the face part according to the region to which the face part belongs. In addition, the first score assignment unit may determine a region in which the center of a rectangle inscribed in or circumscribed about each face part is located, as the region to which the face part belongs, and assign a first score to the face part according to the region to which the face part belongs. Furthermore, the first score assignment unit may determine a region in which one vertex of a polygon inscribed in or circumscribed about each face part is located, as the region to which the face part belongs, and assign a first score to the face part according to the region to which the face part belongs. The second score assignment unit may assign a highest second score to a biggest face part among the face parts, and lower second scores may be assigned sequentially to face parts in respect to decreasing size. Alternatively, the second score assignment unit may assign a highest second score to a smallest face part among the face parts, and lower second scores may be assigned sequentially to face parts in respect to increasing size. The highest second score may correspond to the total number of face parts of the image.

Another embodiment of the present invention provides a method of controlling a digital photographing including dividing an image into a plurality of regions, assigning a first score to each face part included in the image according to a region to which the face part belongs, and determining a face part on which autofocusing is to be performed, based on the first score assigned to each face part.

A further embodiment of the present invention provides a method of controlling a digital photographing apparatus including dividing an image into a plurality of regions, assigning a first score to each face part included in the image according to a region to which the face part belongs, assigning a second score to each face part according to the size of the face part, and determining a face part on which autofocusing is to be performed, based on the first score and the second score assigned to each face part. The assigning of the first score to each face part may include assigning a score to each region, and assigning the score of the region to which a face part belongs, to the face part as the first score. Still another embodiment of the present invention provides a computer readable recording medium having embodied thereon a computer program for executing these methods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
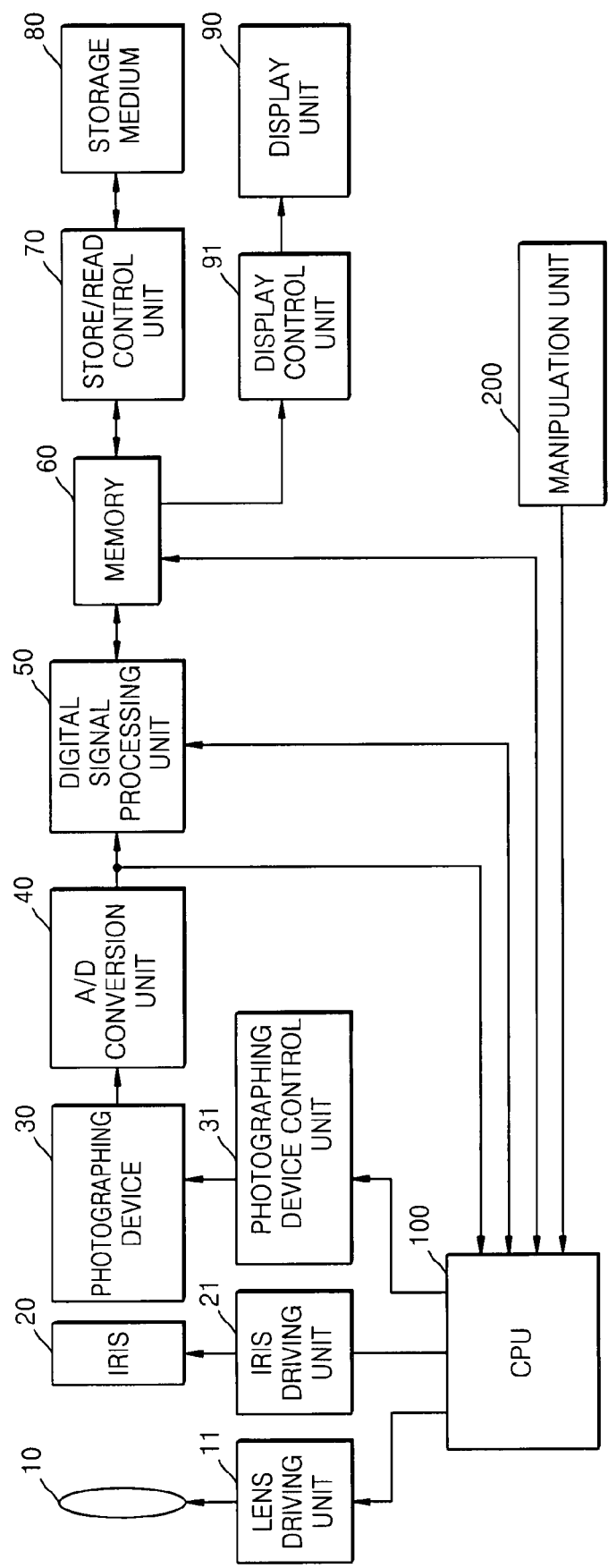
FIG. 1 is a block diagram illustrating a digital photographing apparatus according to an embodiment of the present invention.

FIG. 1 is a block diagram illustrating a digital photographing apparatus according to an embodiment of the present invention. The operation of the digital photographing apparatus is controlled by a CPU 100. A manipulation unit 200, including a key generating an electrical signal from a user, is included in the digital photographing apparatus. An electrical signal from the manipulation unit 200 is transferred to the CPU 100 such that the CPU 100 can control the digital photographing apparatus according to the electrical signal.

In photographing mode, if an electrical signal from the user is transferred to the CPU 100, the CPU 100 identifies the signal and controls a lens driving unit 11, an iris driving unit 21, and a photographing device control unit 31. According to this control, the position of a lens 10, opening of an iris 20, and sensitivity of a photographing device 30 are controlled for autofocusing. If a data signal of an image is output from the photographing device 30, the signal is converted into digital image data by an analog-to-digital (A/D) conversion unit 40, and input to the CPU 100 and a digital signal processing unit 50. The digital signal processing unit 50 performs digital signal processing, such as gamma correction and white balance adjustment.

The image data output from the digital signal processing unit 50 is transferred through a memory 60 or directly to a display control unit 91. Here, the memory 60 includes a read-only memory (ROM) or a random-access memory (RAM). The display control unit 91 controls a display unit 90 and displays an image on the display unit 90. The image data output from the digital signal processing unit 50 can be input to a storing/reading control unit 70 through the memory 60. The storing/reading control unit 70 records the image data on a storing medium 80 automatically or according to a command from the user. Also, the storing/reading control unit 70 can read image data of an image file stored in the storing medium 80, and input the read image data to the display control unit 91 so that the image can be displayed on the display unit 90.

Figure 2:
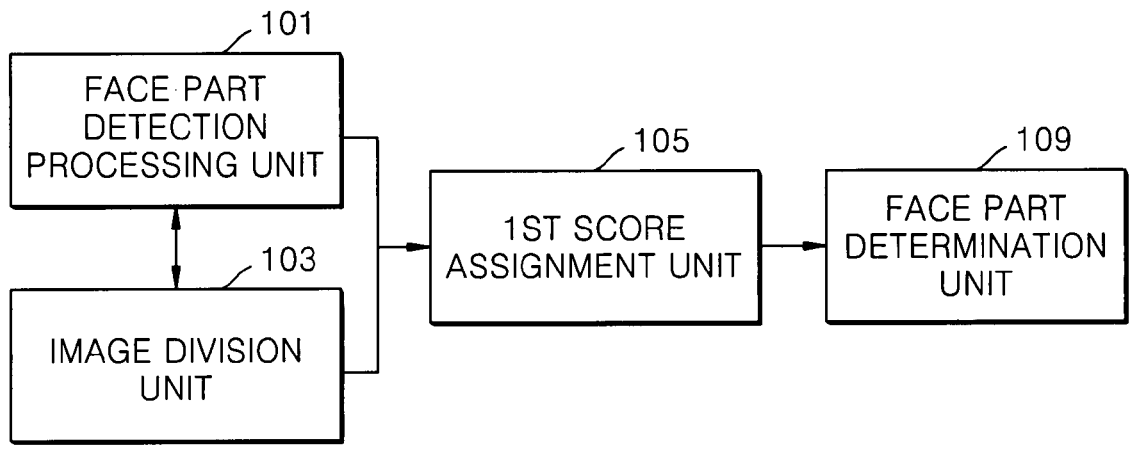
FIG. 2 is a block diagram illustrating a part of the digital photographing apparatus of FIG. 1 according to an embodiment of the present invention.

FIG. 2 is a block diagram illustrating a part of the digital photographing apparatus of FIG. 1 according to an embodiment of the present invention. For example, the elements illustrated in FIG. 2 may be a part of the CPU 100 illustrated in FIG. 1. Also, the elements illustrated in FIG. 2 may not be a part of the CPU 100 and may be separate from the CPU 100. Referring to FIG. 2, the digital photographing apparatus according to this embodiment comprises a face part detection processing unit 101, an image division unit 103, a first score assignment unit 105, and a face part determination unit 109. In the description the term "face part" is defined to mean a part of the image in which an image of a face or a part of a face is present. The face part detection processing unit 101 utilizes data for detecting a face part, which will be explained later, stored in the memory 60, and analyzes the image data output from the digital signal processing unit 50, illustrated in FIG. 1, thereby detecting a face part. The face part detection processing unit 101 can be embodied in many different forms. For example, the face part detection processing unit 101 may analyze image data output from the A/D conversion unit 40, illustrated in FIG. 1, not from the digital signal processing unit 50, illustrated in FIG. 1, so that a face part can be detected.

A variety of methods can be used in order to detect a face part. For example, data related to the main colors of a face may be input in advance and by determining whether or not the data related to the main colors of a face exists in image data, a face part can be detected. Also, data related to the pupils or shape of eyes of a face may be input in advance, and by determining whether or not the data related to the pupils or shape of eyes of face exists in image data, a face part can be detected. Data related to a T shape formed by eyebrows (or eyes) and the nose may be input in advance, and by determining whether or not the data related to the T shape exists in image data, a face part can be detected.

Figure 3:
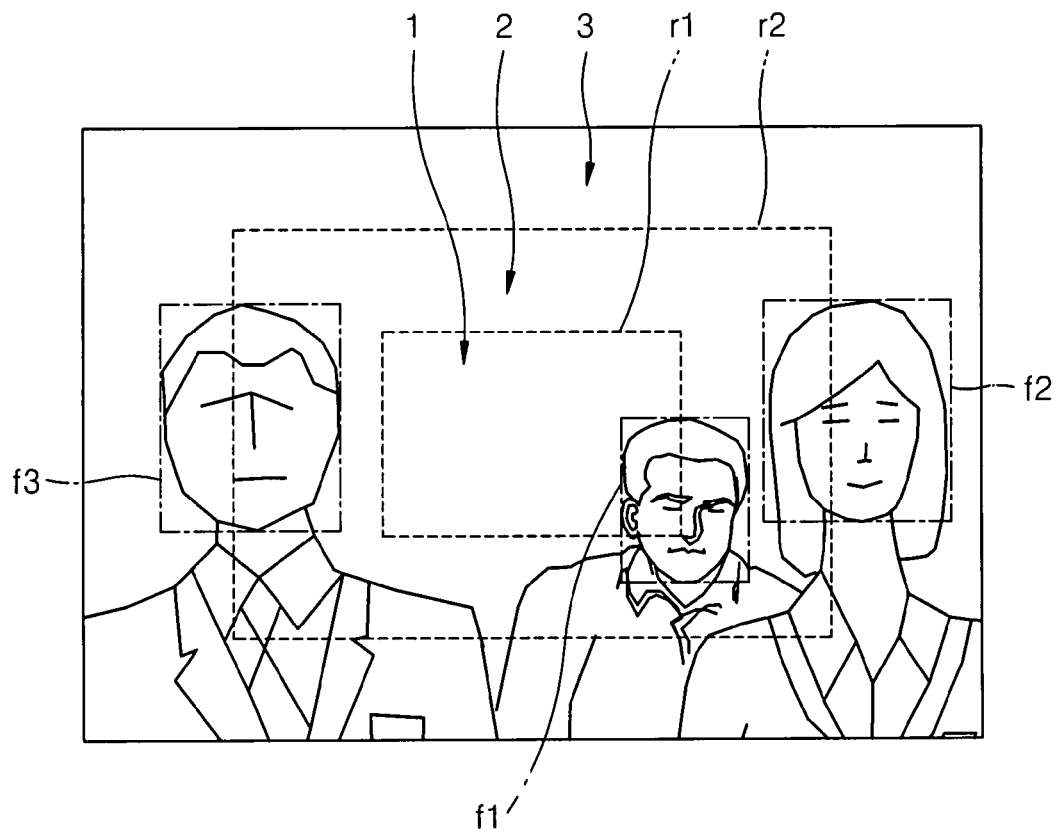
FIG. 3 is a conceptual diagram illustrating an operation of the digital photographing apparatus of FIG. 2 according to an embodiment of the present invention.

The image division unit 103 divides an image into a plurality of regions (1, 2, 3), as illustrated in FIG. 3. Division of the image into the plurality of regions (1, 2, 3) can be performed in a variety of ways. For example, the image can be divided by the number of detected face parts (f1, f2, f3) as illustrated in FIG. 3 (3 face parts are detected in the example illustrated in FIG. 3). In this case, the division of the image into the plurality of regions (1, 2, 3) may be performed by dividing the image into concentric rectangles (r1, r2) having the center of the image as their respective centers. In this case, the concentric rectangles (r1, r2) can be made to divide the image uniformly. Here, the concentric rectangles (r1, r2) are rectangles having an identical center as illustrated in FIG. 3. Also, uniform division by the concentric rectangles (r1, r2) of the image means that the distance between the center of the image and the side of the innermost rectangle (r1), the distance between adjacent sides of the concentric rectangles (r1, r2), and the distance between the side of the outermost rectangle (r2) and the side of the image are the same or substantially the same.

The first score assignment unit 105, illustrated in FIG. 2, assigns a first score to each face part (f1, f2, f3) illustrated in FIG. 3, according to a region to which the face part (f1, f2, f3) belongs. That is, the first score assignment unit 105 assigns a score to each region 1, 2, and 3 generated by dividing the image, and assigns the score of the region to which the face part (f1, f2, f3) belongs, as a first score, to each face part (f1, f2, f3). Also, assigning a score to each divided region 1, 2, and 3 of the image may be performed in the image division unit 103, illustrated in FIG. 2, and the first score assignment unit 105, illustrated in FIG. 2, may assign the score of the region to which the face part (f1, f2, f3) belongs to each face part (f1, f2, f3). If the face part detection processing unit 101, illustrated in FIG. 2, cannot detect a face part, for example, if a face does not exist in the image, the first score assignment unit 105, illustrated in FIG. 2, does not have to assign a score to regions in the image. A case where the face part detection processing unit 101 detects a plurality of face parts will now be explained.

Assigning a score to each divided region 1, 2, and 3 of the image, that is, assigning a different score to each divided region 1, 2, and 3 can be performed in a variety of ways. For example, a highest score may be given to the region 1 in the innermost rectangle (r1) among the concentric rectangles (r1, r2), and lower scores may respectively be given sequentially to the region 2 between the concentric rectangles (r1, r2) and the outermost region 3, the score decreasing with distance from the center of the image. A score of 5, for example, may be given to the region 1 inside the innermost rectangle (r1), 3 to the region 2 between the two concentric rectangles (r1, r2), and 2 a score of to the outermost region 3. Unlike the image illustrated in FIG. 3, if the image is divided by a large number of concentric rectangles than 2, a lower score may be given sequentially to the regions between concentric rectangles from the center of the image. Meanwhile, when scores are given to respective regions in this order, a score which is given to the region 1 inside the innermost rectangle (r1) among the concentric rectangles (r1, r2) may be the number of the divided regions 1 through 3 of the image. For example, in FIG. 3, a score of 3 can be given to the innermost region 1, a score of 2 can be given to the region 2 between the two concentric rectangles (r1, r2), and 1 mark can be given to the outermost region 3. This case will now be explained in more detail.

In order to assign the score of one of the regions (1, 2, 3) to the face part (f1, f2, f3), as a first score, it should be first determined to which region each face part (f1, f2, f3) belongs, and this can be performed in a variety of ways. For example, a region to which a vertex of a rectangle inscribed in or circumscribed about each face part (f1, f2, f3) belongs may be determined as a region to which the face part (f1, f2, f3) belongs. That is, for example, a region to which the top left vertex of a rectangle inscribing or circumscribing each face part (f1, f2, f3) belongs may be determined as a region to which the face part (f1, f2, f3) belongs. In the case illustrated in FIG. 3, a region which the top left vertex of a rectangle circumscribing each face part (f1, f2, f3) may be determined as a region to which the face part (f1, f2, f3) belongs. In this case, it is determined that the face part f1 belongs to the innermost region 1, the face part f2 belongs to the region 2 between the two concentric rectangles (r1, r2), and the face part f3 belongs to the outermost region 3. Accordingly, as a first score, a score of 3 that is a score for the innermost region 1 is given to the face part f1, a score of 2 that is a score for the region 2 between the two concentric rectangles (r1, r2) is given to the face part f2, and a score of 1 that is a score for the outermost region 3 is given to the face part f3.

Unlike this case, when a region to which each face part (f1, f2, f3) belongs is determined, a region to which the center of a rectangle inscribed in or circumscribed about each face part (f1, f2, f3) belongs may be determined as a region to which the face part belongs. Also, a region to which a vertex of a polygon inscribed in or circumscribed about each face part (f1, f2, f3) belongs may be determined as a region to which the face part belongs. In this way, the method can be performed in a variety of ways.

The face part determination unit 109, illustrated in FIG. 2, determines a face part on which autofocusing is to be performed, based on the first score assigned to each face part. If the face part detection processing unit 101, illustrated in FIG. 2, cannot detect a face part, for example, if a face does not exists in an image, the first score assignment unit 105, illustrated in FIG. 2, does not assign a first score to any region in the image, and the face part determination unit 109 does not determine a face part which is to be an object of autofocusing. If the face part detection processing unit 101 detects one face part, for example, if only one face exists in the image, the face part determination unit 109 determines the one detected face part as a face part on which autofocusing is to be performed. If the face part detection processing unit 101 detects a plurality of face parts, for example, if a plurality of faces exist in the image, the face part determination unit 109 determines any one face part of the plurality of detected face parts as a face part to be an object of autofocusing.

The face part determination unit 109 compares the first scores assigned to respective face parts, and determines a face part having a highest first score as a face part on which autofocusing is to be performed. In the case described above, when a score is given to each region 1, 2, and 3 of an image, and a first score is assigned to each of detected face parts (f1, f2, f3), a score of 3 are assigned to the face part f1, a score of 2 to the face part f2, and a score of 1 to the face part f3. Accordingly, the face part f1 is determined the face part on which autofocusing is to be performed.

Thus, in the digital photographing apparatus according to this embodiment, when a plurality of persons are photographed, a face part which on which autofocusing is to be performed is automatically determined from detected face parts, thereby autofocusing can be performed. In this way, a digital photographing apparatus greatly improving user convenience can be realized.

The image division unit 103, the first score assignment unit 105 and the face part determination unit 109 may assign a score and determine a face part on which autofocusing is to be performed, in a manner different from that described above. For example, when an image is divided into a plurality of regions 1 through 3 as illustrated in FIG. 3 and a score is assigned to each divided region 1, 2, and 3, a highest score may be assigned to the outermost region 3 among the regions 1, 2, and 3 divided by the concentric rectangles (r1, r2), and lower scores may be assigned sequentially to the region 2 between the concentric rectangles (r1, r2) and the region 1 inside the innermost rectangle (r1) with the score decreasing towards the center of the image.

That is, among the regions 1, 2, and 2 divided by the concentric rectangles (r1, r2), a score of 3 may be given to the outermost region 3, and a score of 2 and a score of 1 may be respectively given to the region 2 between the concentric rectangles (r1, r2) and the region 1 inside the innermost rectangle (r1), with the score decreasing towards the center of the image. In this case, if it is determined that a region to which the top left vertex of a rectangle inscribed in or circumscribed about each face part (f1, f2, f3) is the region to which the face part (f1, f2, f3) belongs, it is determined that the face part f1 belongs to the innermost region 1, the face part f2 belongs to the region 2 between the two concentric rectangles (r1, r2), and the face part f3 belongs to the outermost region 3.

Accordingly, as a first score a score of 1, which is the score of the innermost region 1, is given to the face part f1, a score of 2, which is the score of the region 2 between the two concentric rectangles (r1, r2) is given to the face part f2, and a score of 3, which is the score of the outermost region 3, is given to the face part f3. Thus, after the first score is given to each face part (f1, f2, f3), the face part determination unit 109 may determine a face part having a lowest first score, to be the face part on which autofocusing is to be performed. As described above, when a score is given to each region 1, 2, and 3 of an image, and a first score is assigned to each of detected face parts (f1, f2, f3), as the first score, a score of 1 mark is assigned to the face part f1, a score of 2, to the face part f2, and a score of 3, to the face part f3. Accordingly, in the above described example, the face part f1 is determined as the object face part of autofocusing. However, the manner in which face part autofocusing is to be performed is not limited to this example.

Thus, according to the digital photographing apparatus of this embodiment, when a plurality of persons are photographed, a face part which on which autofocusing is to be performed is automatically determined from detected face parts, thereby performing autofocusing. In this way, a digital photographing apparatus greatly improving user convenience can be implemented. In particular, an image is divided into a plurality of regions, a different score is assigned to each region, a first score of each face part is determined to be the score of a region to which each detected face part belongs, and according to the first score, a face part on which autofocusing is to be performed is determined. Accordingly, if a region is preferred by a user, a face part positioned at the region is automatically determined to be the face part on which autofocusing is to be performed, thereby greatly improving the user's convenience.

Meanwhile, after a plurality of face parts in an image are detected, the distance between the center of the image and each face part can be calculated, and then a face part closest or furthest from the center of the image may be determined as the face part on which autofocusing is to be performed. However, if the face part on which autofocusing is to be performed is determined in this way, a process of calculating a distance between the center of the image and each face part is performed, which may put a certain load on the CPU of the digital photographing apparatus. However, the digital photographing apparatus according to this embodiment does not need to perform this complicated process, which includes calculating the distance between the center of the image and each face part. In particular, in the digital photographing apparatus according to this embodiment, the division of an image into a plurality of regions may be performed in advance, and the data may be stored in the digital photographing apparatus. Then, by simply fetching the stored data, the face part on which autofocusing is to be performed can be easily determined. Accordingly, since the digital photographing apparatus according to this embodiment determines to which region among divided regions of an image each face part belongs, no significant load is imposed on the CPU, and a face part which is to be an object of autofocusing can be quickly and accurately determined.

Figure 4:
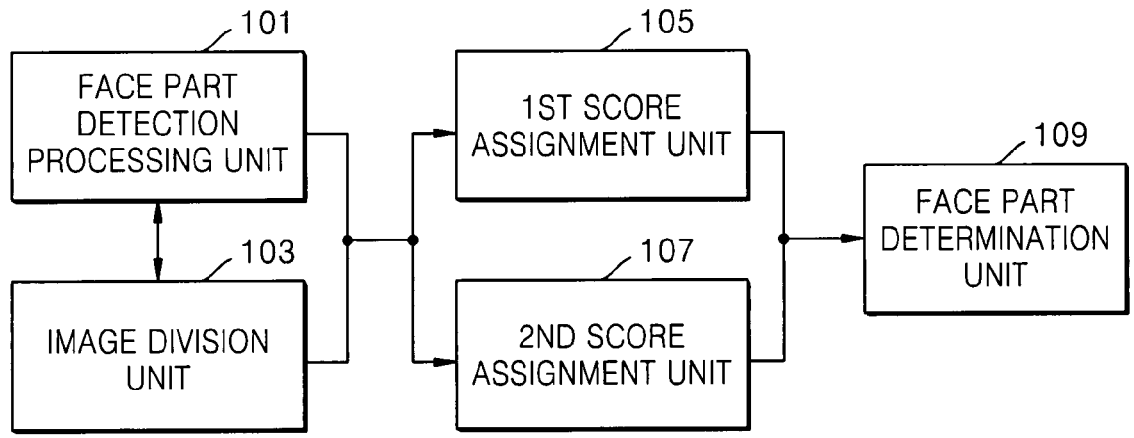
FIG. 4 is a block diagram illustrating a part of a digital photographing apparatus according to another embodiment of the present invention.

FIG. 4 is a block diagram illustrating a part of a digital photographing apparatus according to another embodiment of the present invention. As shown in FIG. 4, a digital photographing apparatus according to this embodiment further includes a second score assignment unit 107 unlike the digital photographing apparatus described above with reference to FIG. 2. A face part determination unit 109 determines a face part on which autofocusing is to be performed, based on a first score and a second score assigned to each face part. That is, the digital photographing apparatus according to this embodiment can determine a face part on which autofocusing is to be performed, by considering the distance between the digital photographing apparatus and each face as well as the position of each face part in an image.

For example, as described above, in a situation as illustrated in FIG. 3, a first score assignment unit 105 assigns a score of 3 to the innermost region 1, a score of 2 to the region 2 between the two concentric rectangles (r1, r2), and a score of 1 to the outermost region 3, and according to this, a score of 3, which is the score of the innermost region 1, is assigned to the face part f1, a score of 2, which is the score of the region 2 between the two concentric rectangles (r1, r2), is assigned to the face part f2, and a score of 1, which is the score of the outermost region 3, is assigned to the face part f3.

In addition to this assignment by the first score assignment unit 105 of the first score to each face part, the second score assignment unit 107 assigns a score to each face part according to the size of the face part. In this case, if the size of a face part in the image is relatively large, it implies that the distance between the digital photographing apparatus and the face part is relatively short. For example, a highest second score may be assigned to the face part f2 which is the biggest among the face parts (f1, f2, f3), and lower second scores may be given sequentially to the detected face parts (f3, f1) in respect to decreasing size. That is, as a second score of 5 may be given to the face part f2 that is the biggest among the face parts (f1, f2, f3), a second score of 3 may be given to the mid-sized face part f3, and a second score of 1 may be given to the smallest face part f1. Alternatively, the value of the highest second score may correspond to the number of face parts and, in this case, may be given to the biggest face part f2 among the face parts (f1, f2, f3). In this case, as a second score of, 3 are given to the biggest face part f2 among the face parts (f1, f2, f3), a second score of 2 are given to the mid-sized face part f3, and a second score of 1 is given to the smallest face part f1. This case will now be explained in more detail.

Thus, after the first score assignment unit 105 and the second score assignment unit 107 assign the first score and the second score to each face part (f1, f2, f3), the face part determination unit 109 determines a face part on which autofocusing is to be performed, based on the first and second scores assigned to each face part (f1, f2, f3). For example, the face part determination unit 109 may determine a face part having a biggest sum or mean of the first score and the second score, as a face part on which autofocusing is to be performed. If it is assumed that the face part on which autofocusing is to be performed is determined by using the sum of the first and second scores, and the first score and the second score, are assigned to each face part (f1, f2, f3) as described above, in the case of the face part f1, the first score is 3, the second score is 1, and thus the sum is 4. In the case of face part f2, the first score is 2, the second score is 3, and thus the sum is 5. In the case of face part f3, the first score is 1, the second score is 2, and thus the sub is 3.

Thus, according to the digital photographing apparatus of this embodiment, when a plurality of persons are photographed, a face part on which autofocusing is to be performed is automatically determined from detected face parts, and thus autofocusing can be performed. In this way, a digital photographing apparatus greatly improving user convenience without putting an excessive computational load on the photographing apparatus can be implemented. In particular, by considering the position of each face part in an image and the distance between the digital photographing apparatus and each face, the digital photographing apparatus automatically determines a face part on which autofocusing is to be performed, thereby greatly improving user convenience.

Figure 5:
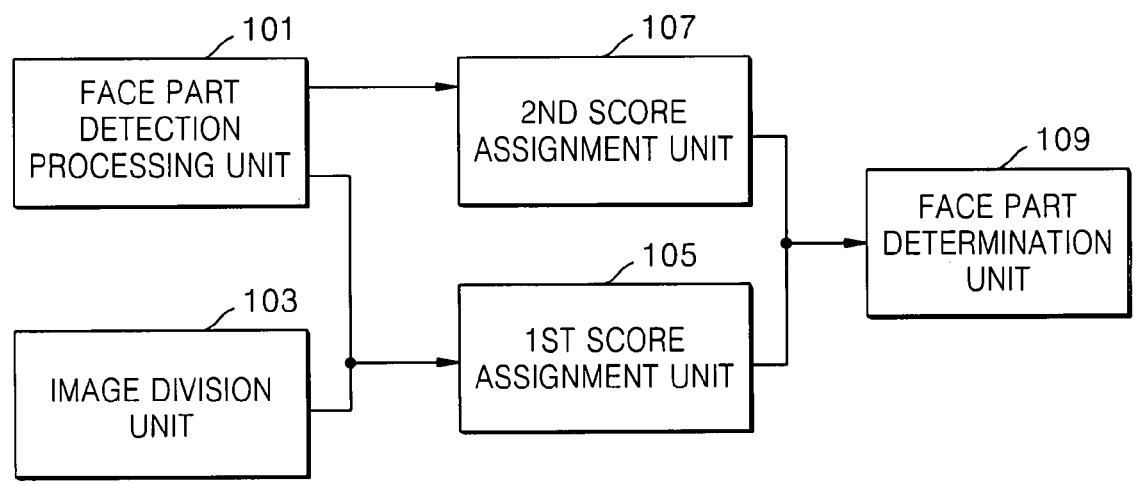
FIG. 5 is a block diagram illustrating a part of a digital photographing apparatus according to another embodiment of the present invention.

FIG. 4 illustrates that both the first score assignment unit 105 and the second score assignment unit 107 receive data from the face part detection processing unit 101 and the image division unit 103. However, as illustrated in FIG. 5, which is a block diagram illustrating a part of a digital photographing apparatus according to another embodiment of the present invention, a first score assignment unit 105 may receive data from a face part detection processing unit 101 and an image division unit 103, and a second score assignment unit 107 may receive data from a face part detection processing unit 101. In this case, when a plurality of face parts are detected in one image, depending on a user, the position of each face in the image may be regarded as being more important than the distance between the digital photographing apparatus and each face, or vice versa. Accordingly, this can be considered when determining the face part on which autofocusing is to be performed. That is, when a face part on which autofocusing is to be performed is determined in the face part determination unit 109 based on the first score and the second score of each detected face part, the face part on which autofocusing is to be performed may be determined based on the sum or mean of values obtained by assigning a first weight to the first score and a second weight to the second score.

For example, if the user regards the position of each face part as more important than the distance between the digital photographing apparatus and each face part, the first weight assigned to the first score related to the position of each face part may be 7, and the second weight assigned to the second score related to the distance between the digital photographing apparatus and the face may be 3. As described above, if the first score and second score of the face part f1 are 3 and 1, respectively, the first score and second score of the face part f2 are 2 and 3, respectively, and the first score and second score of the face part f3 are 1 and 2, respectively, and the face part determination unit 109 determines a face part on which autofocusing is to be performed, based on the sum of a value obtained by giving the first weight to the first score and a value obtained by giving the second weight to the second score. In this example, the score of the face part f1 is 24 (3*7+1*3), the score of the face part f2 is 23 (2*7+3*3), and the score of the face part f3 is 13 (1*7+2*3). Accordingly, since the face part f1 has the highest score, the face part f1 is determined as the face part on which autofocusing is to be performed.

Alternatively, if the user regards the distance between the digital photographing apparatus and each face part as being more important than the position of each face in the image, the first weight assigned to the first score related to the position of each face part may be 3, and the second weight assigned to the second score related to the distance between the digital photographing apparatus and the face may be 7. As described above, if the first score and second score of the face part f1 are 3 and 1, respectively, the first score and second score of the face part f2 are 2 and 3, respectively, and the first score and second score of the face part f3 are 1 and 2, respectively, and the face part determination unit 109 determines a face part on which autofocusing is to be performed based on the sum of a value obtained by giving the first weight to the first score and a value obtained by giving the second weight to the second score, the score of the face part f1 is 16 (3*3+1*7), the score of the face part f2 is 27 (2*3+3*7), and the score of the face part f3 is 17(1*3+2*7). Accordingly, since the face part f2 has the highest score, the face part f2 is determined as the face part on which autofocusing is to be performed.

When a first weight and a second weight are given in order to determine the face part on which autofocusing is to be performed, the first weight and second weight can be preset by the user. Thus, according to the digital photographing apparatus of this embodiment, when a plurality of persons are photographed, a face part on which autofocusing is to be performed is automatically determined from detected face parts, and thus, autofocusing can be performed. In this way, a digital photographing apparatus greatly improving user convenience can be implemented. In particular, by considering the position of each face part in an image and the distance between the digital photographing apparatus and each face, the digital photographing apparatus automatically determines a face part on which autofocusing is to be performed, thereby greatly improving user convenience.

Alternatively to the above description, when the first score assignment unit 105, as illustrated in FIGS. 2, 4, and 5, assigns a score to each region of the image, for example, to each region 1, 2, and 3 divided as illustrated in FIG. 2, a highest score may be assigned to the outermost region 3 among the regions 1, 2, and 3 divided by the concentric rectangles (r1, r2), and lower scores may be assigned sequentially to the region 2 between the concentric rectangles (r1, r2) and the region 1 inside the innermost rectangle (r1) the value decreasing towards the center of the image. In this case, when the second score assignment unit 107, as illustrated in FIGS. 4 and 5, assigns a second score to each face part according to the size of the face part, a highest second score may be assigned to the smallest face part f1 among the face parts (f1, f2, f3), and lower second scores may be assigned to the face parts (f2, f3) in respect to increasing size. Also, when the face part on which autofocusing is to be performed is determined based on the sum of the first score and the second score, the face part determination unit 109, illustrated in FIGS. 4 and 5, may determine a face part having a lowest sum, as the face part on which autofocusing is to be performed. Thus, a variety of changes can be made to the embodiments of the present invention described herein.

Figure 6:
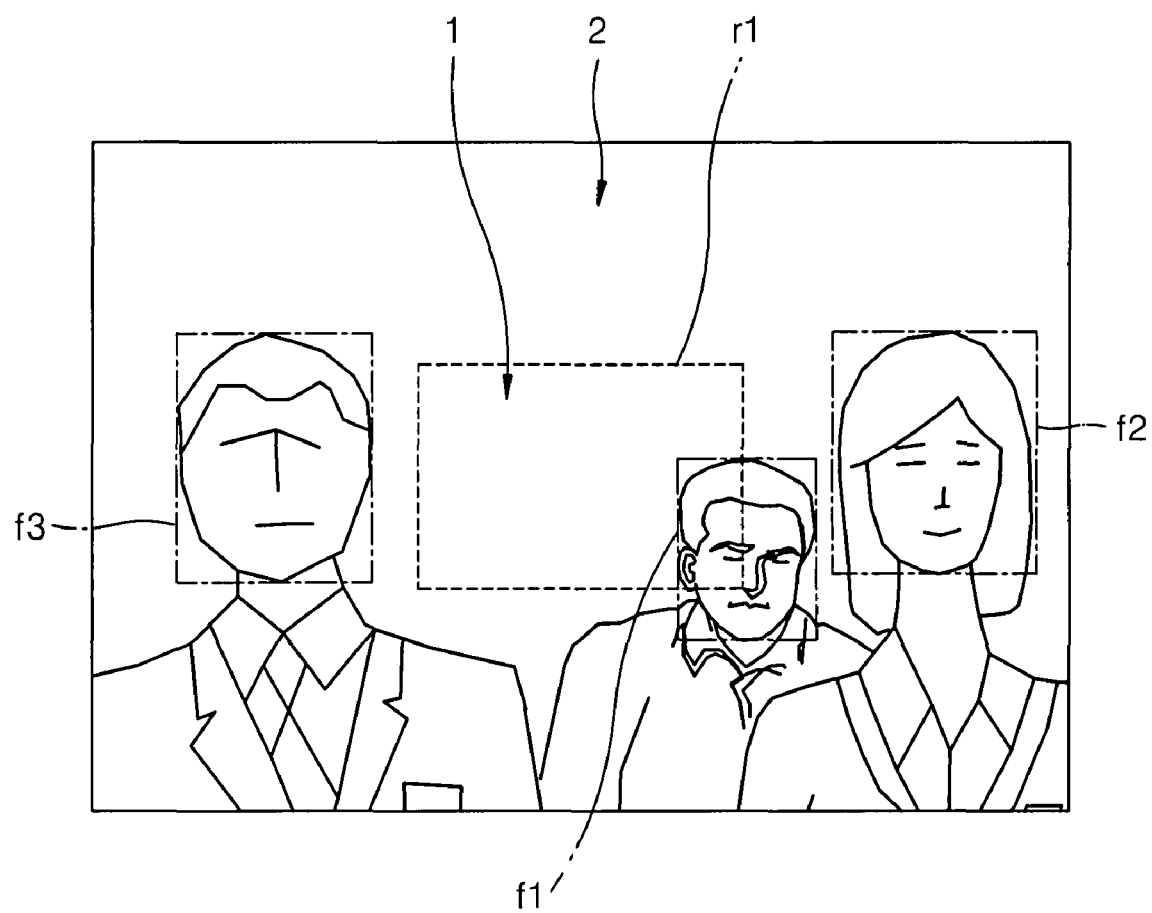
FIG. 6 is a conceptual diagram illustrating an operation of a digital photographing apparatus according to another embodiment of the present invention.

FIG. 6 is a conceptual diagram illustrating an operation of a digital photographing apparatus according to another embodiment of the present invention.

The difference between the conceptual diagram of FIG. 6 and that of FIG. 3, referred to in the embodiment described above, is the number of regions that the image is divided into, even though the number of face parts (f1, f2, f3) is the same (namely 3). That is, in FIG. 3, the image is divided into three regions 1, 2, and 3 by the two concentric rectangles (r1, r2), but in FIG. 6, the image is divided into two regions 1 and 2 by one rectangle (r1). Thus, when an image is divided into a plurality of regions, the number of regions the image is divided into may be various.

Figure 7:
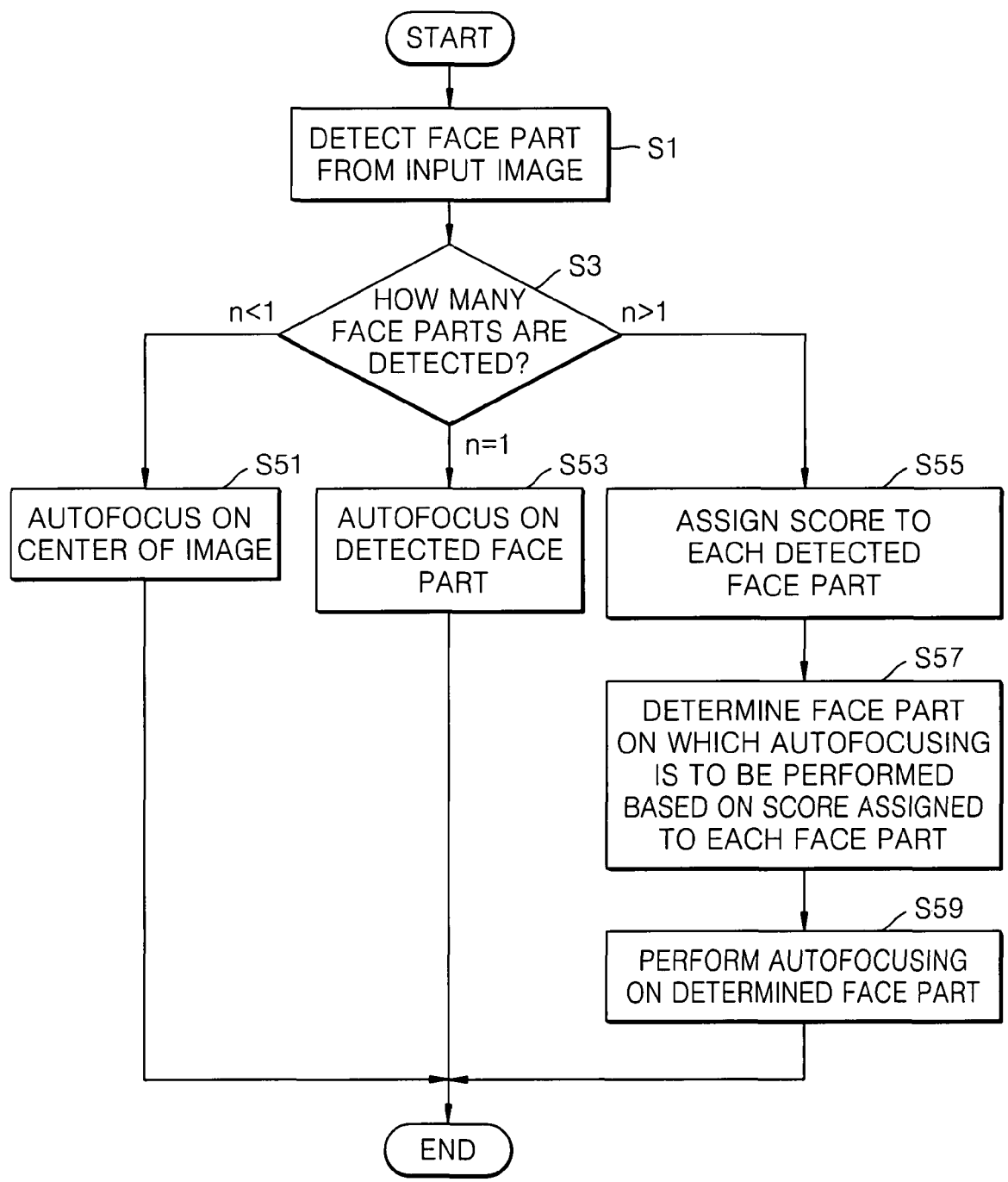
FIG. 7 is a flowchart of a method of controlling a digital photographing apparatus according to an embodiment of the present invention.

FIG. 7 is a flowchart of a method of controlling a digital photographing apparatus according to an embodiment of the present invention. As indicated in this example, face parts are detected from an input image in operation S1. Then, the number of the detected face parts is determined in operation S3. If no face parts are detected, autofocusing is performed in operation S51 as it is performed in an ordinary digital photographing apparatus, for example, in relation to an object positioned at the center of the image. If one face part is detected, autofocusing of the detected one face part is performed in operation S53. If a plurality of face parts are detected, a score is assigned to each face part in operation S55, and based on the score assigned to each face part, a face part on which autofocusing is to be performed is determined in operation S57. In relation to the determined face part, autofocusing is performed in operation S59. Operation S55 for assigning a score to each face part when a plurality of face parts are detected can be performed as in the embodiment illustrated in FIG. 8.

Figure 8:
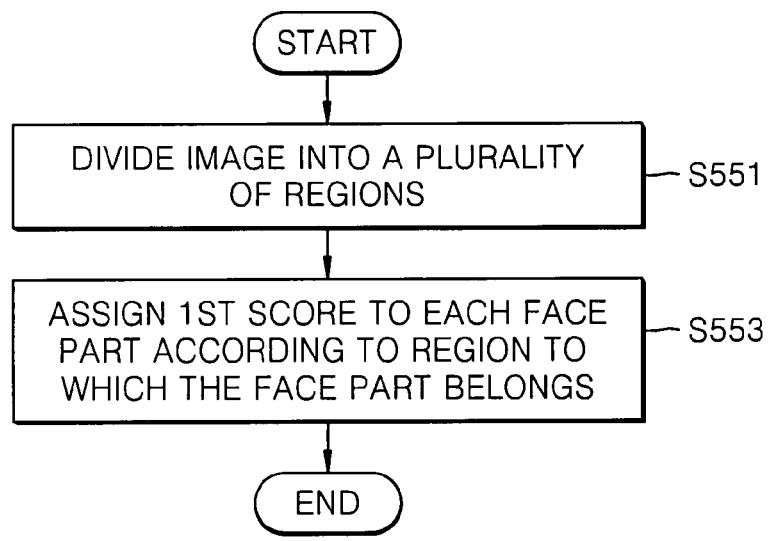
FIG. 8 is a detailed flowchart illustrating an operation for assigning a score to each face part illustrated in the flowchart of FIG. 7 according to an embodiment of the present invention.

Referring to FIG. 8, the image is divided into a plurality of regions in operation S551, and a first score is assigned to each face part according to the region to which each face part belongs in operation S553. Then, as illustrated in FIG. 7, based on the first score assigned to each face part, autofocusing is performed on a selected face part in operation S57. For example, autofocusing can be performed on a face part having a highest first score. When necessary, autofocusing may be performed on a face part having a lowest first score. In this way, a variety of embodiments may be implemented.

When an image is divided into a plurality of regions in operation S551, the image may be divided by the number of detected face parts. Also, when an image is divided into a plurality of regions in operation S551, the image may be divided into concentric rectangles having an identical center that is the center of the image. In this case, the concentric rectangles can be made to divide the image uniformly.

When a first score is assigned to each face part according to a region to which the face belongs in operation S553, a highest score may be assigned to a region inside an innermost rectangle among the concentric rectangles, and lower scores may be assigned sequentially to regions further from the center of the image. Then, the score of a region to which each face belongs may be assigned to each face part as a first score. In this case, a score corresponding to the number of the divided regions of the image may be assigned to the region inside the innermost region among the concentric rectangles. Alternatively, a highest score may be assigned to an outermost region among the regions divided by the concentric rectangles and the other regions may be assigned with sequentially lower scores towards the center of the image.

Figure 9:
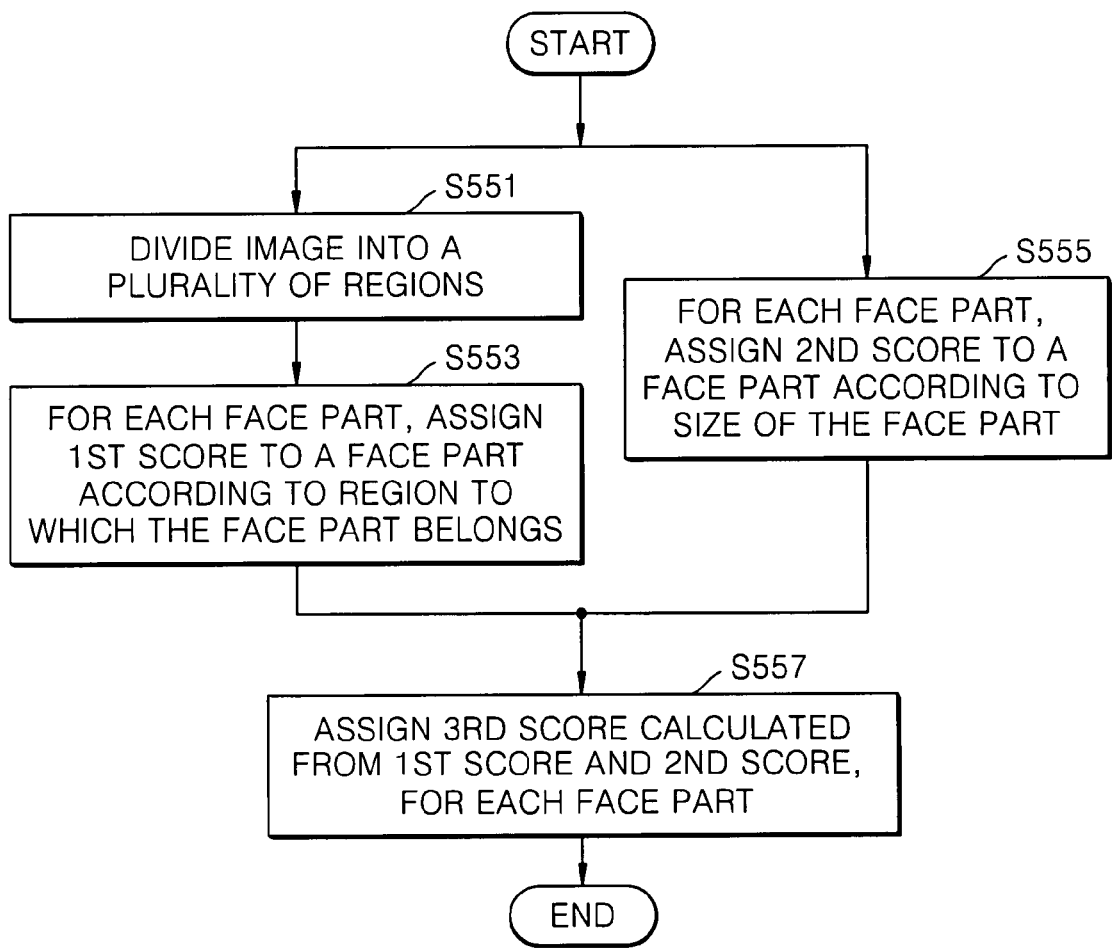
FIG. 9 is a detailed flowchart illustrating an operation for assigning a score to each face part in a method of controlling a digital photographing apparatus according to an embodiment of the present invention.

When a first score is assigned to each face part according to the region to which the face part belongs in operation S553, in order to determine the region to which each face part belongs, a region to which one vertex of a rectangle or polygon inscribed in or circumscribed about each face part may be used, or a region to which the center of a rectangle or polygon inscribed in or circumscribed about each face part may be determined to be a region to which the face part belongs. Alternatively, operation S55 illustrated in FIG. 7 for assigning a score to each face part when a plurality of face parts are detected can be performed as in the embodiment illustrated in FIG. 9. In FIG. 9, operations S551 and S553 are the same as explained above with reference to FIG. 8. In this way, the first score is assigned to each face part, and according to the size of each face part, a second score is assigned in operation S555. Also, a third score calculated from a combination of the first score and the second score is assigned to each face part in operation S557.

Then, as illustrated in FIG. 7, based on the score assigned to each face part, that is, based on the third score assigned to each face part, a face part on which autofocusing is to be performed is determined in operation S557, and autofocusing is performed in relation to the determined face part in operation S59. When necessary, autofocusing may be performed on a face part having a lowest score. In this way, a variety of embodiments may be implemented.

In FIG. 9, operations S551 and S553 may be performed concurrently with operation S555. Alternatively, after operations S551 and S553, operation S555 may be performed. Also, after operation S555, operations S551 and S553 may be performed. In this way, a variety of embodiments may be implemented.

When a second score is assigned to each face part according to the size of the face part in operation S555, for example, a highest second score may be assigned to a biggest face part, and lower second scores may be assigned sequentially to other face parts according to the decreasing size of the face parts. Alternatively, a highest second score may be assigned to a smallest face part among face parts, and lower scores may be assigned sequentially to other face parts according to the increasing size of the face parts. In this way, a variety of embodiments may be implemented. When a third score calculated from the first score and the second score is assigned to each face part in operation S557, the third score may be the sum or mean of the first score and the second score, and may also be the sum or mean of a value obtained by giving a first weight to the first score and a second weight to the second score.

As can be appreciated from the above, a program for executing the control method of the digital photographing apparatus according to the embodiments and variations of present invention can be stored in a recording medium. The recording medium may be the storage medium 80 or the memory 60 as illustrated in FIG. 1, or may also be a separate recording medium. Examples of the recording medium include magnetic storage medium (for example, read-only memory (ROM), and hard disks) and optical data storage devices (for example, CD-ROM, digital versatile disc (DVD)). Also, the CPU 100 illustrated in FIG. 1 or part of the CPU 100 may be employed as the recording medium.

As can further be appreciated from the above, when a plurality of persons are photographed according to the embodiments of the present invention, the operations for determining a face part of a person on which autofocusing is to be performed do not impose an excessive computational load on the digital photographing apparatus, thereby enabling autofocusing to be performed efficiently while greatly improving user convenience.

While the present invention has been particularly shown and described with reference to exemplary embodiments thereof, it will be understood by those of ordinary skill in the art that various changes in form and details may be made therein without departing from the spirit and scope of the present invention as defined by the following claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A digital photographing apparatus comprising:
a face part detection processing unit that detects a plurality of face parts in an image;
an image division unit that divides the image into a plurality of regions without considering a position or a size of each face part of the plurality of face parts included in the image;
a first score assignment unit that assigns a value to each region of the plurality of regions regardless of whether a face part is included in the corresponding region, and assigns a first score to each face part of the plurality of face parts included in the image based on the value of a region to which the corresponding face part belongs; and
a face part determination unit that determines a face part among the plurality of face parts as an object of autofocusing, based on the first scores assigned to the plurality of face parts.

2. The apparatus of claim 1, wherein the face part determination unit determines a face part having a highest first score or a lowest first score, as the face part on which autofocusing is to be performed.

3. The apparatus of claim 1, wherein the image division unit divides the image into a number of regions which is the same as the number of face parts included in the image.

4. The apparatus of claim 1, wherein the image division unit divides the image into concentric rectangles having the center of the image as their common center.

5. The apparatus of claim 1, wherein for each face part, the first score assignment unit determines a region in which one vertex of a rectangle inscribed in or circumscribed about the face part is located as the region to which the corresponding face part belongs, and assigns the first score to the corresponding face part according to the region to which the corresponding face part belongs.

6. The apparatus of claim 1, wherein for each face part, the first score assignment unit determines a region in which the top left vertex of a rectangle inscribed in or circumscribed about the face part is located as the region to which the corresponding face part belongs, and assigns the first score to the corresponding face part according to the region to which the corresponding face part belongs.

7. The apparatus of claim 1, wherein for each face part, the first score assignment unit determines a region in which the center of a rectangle inscribed in or circumscribed about the face part is located as the region to which the corresponding face part belongs, and assigns the first score to the corresponding face part according to the region to which the corresponding face part belongs.

8. The apparatus of claim 1, wherein for each face part, the first score assignment unit determines a region in which one vertex of a polygon inscribed in or circumscribed about the face part is located as the region to which the corresponding face part belongs, and assigns the first score to the corresponding face part according to the region to which the corresponding face part belongs.

9. A digital photographing apparatus comprising:
a face part detection processing unit that detects a plurality of face parts in an image;
an image division unit that divides the image into a plurality of regions without considering a position or a size of each face part of the plurality of face parts included in the image;
a first score assignment unit that assigns a value to each region of the plurality of regions regardless of whether a face part is included in the corresponding region, and assigns a first score to each face part of the plurality of face parts included in the image based on the value of a region to which the corresponding face part belongs;
a second score assignment unit that assigns a second score to each face part according to the size of the face part; and
a face part determination unit that determines a face part among the plurality of face parts as an object of autofocusing, based on the first scores and the second scores assigned to each face part.

10. The apparatus of claim 9, wherein the face part determination unit determines a face part having a highest sum or mean of the first scores and the second scores, or a lowest sum or mean of the first scores and the second scores, as the face part on which autofocusing is to be performed.

11. The apparatus of claim 9, wherein the face part determination unit determines the face part on which autofocusing is to be performed, based on the sum or mean of a value obtained by assigning a first weight to the first scores and a value obtained by assigning a second weight to the second scores, for each face part of the plurality of face parts.

12. The apparatus of claim 9, wherein the image division unit divides the image into a number of regions which is the same as the number of the plurality of face parts included in the image.

13. The apparatus of claim 9, wherein the image division unit divides the image into concentric rectangles having the center of the image as their common center.

14. The apparatus of claim 9, wherein for each face part, the first score assignment unit determines a region in which one vertex of a rectangle inscribed in or circumscribed about the face part is located as the region to which the corresponding face part belongs, and assigns the first score to the corresponding face part according to the region to which the corresponding face part belongs.

15. The apparatus of claim 9, wherein for each face part, the first score assignment unit determines a region in which the top left vertex of a rectangle inscribed in or circumscribed about the face part is located as the region to which the corresponding face part belongs, and assigns the first score to the corresponding face part according to the region to which the corresponding face part belongs.

16. The apparatus of claim 9, wherein for each face part, the first score assignment unit determines a region in which the center of a rectangle inscribed in or circumscribed about the face part is located as the region to which the corresponding face part belongs, and assigns the first score to the corresponding face part according to the region to which the corresponding face part belongs.

17. The apparatus of claim 9, wherein for each face part, the first score assignment unit determines a region in which one vertex of a polygon inscribed in or circumscribed about the face part is located as the region to which the corresponding face part belongs, and assigns the first score to the corresponding face part according to the region to which the corresponding face part belongs.

18. A method of controlling a digital photographing apparatus comprising:
- detecting a plurality of face parts in an image;
- dividing the image into a plurality of regions without considering a position or a size of each face part of the plurality of face parts included in the image;
- assigning a value to each region of the plurality of regions regardless of whether a face part is included in the corresponding region;
- assigning a first score to each face part of the plurality of face parts included in the image based on the value of a region to which the corresponding face part belongs; and
- determining a face part among the plurality of face parts as an object of autofocusing, based on the first scores assigned to the plurality of face parts.

19. The method of claim 18 further comprising:
- assigning a second score to each face part of the plurality of face parts according to a size of the face part; and
- wherein the determining step is performed according to the first scores and the second scores assigned to each face part of the plurality of face parts.

20. A recording medium having embodied thereon a computer program for executing the method of claim 18.

* * * * *